Nov. 5, 1929.  F. V. DONALD  1,734,718
TRANSMISSION UNIT
Filed May 28, 1925  2 Sheets-Sheet 1

INVENTOR.
FORREST V. DONALD.
BY
Bottum, Hudnall, Decker & McNamara
ATTORNEYS.

Nov. 5, 1929.  F. V. DONALD  1,734,718
TRANSMISSION UNIT
Filed May 28, 1925   2 Sheets-Sheet 2
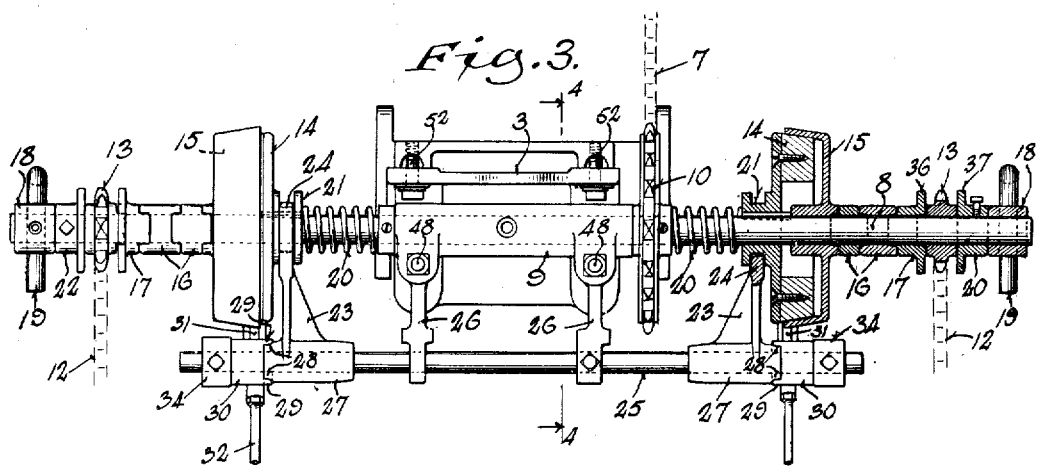
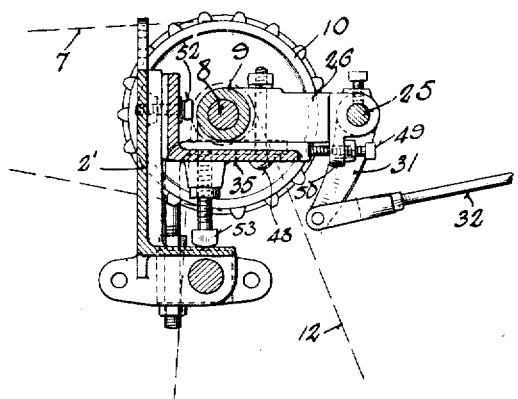
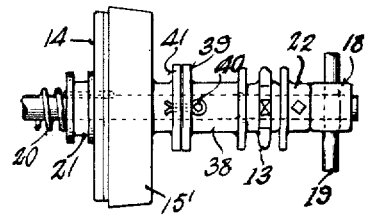
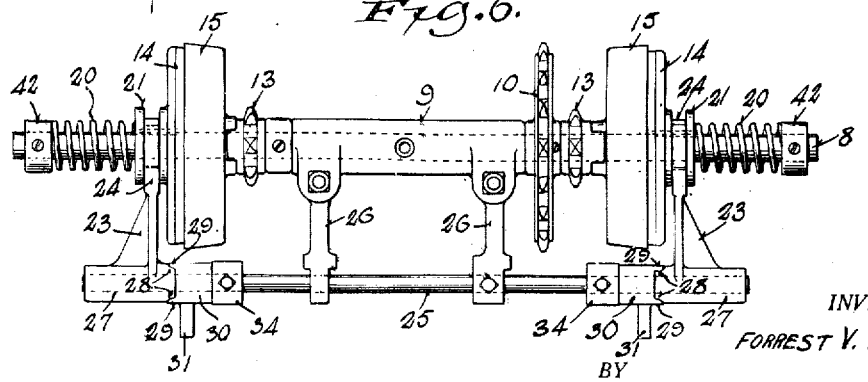
INVENTOR.
FORREST V. DONALD Patented Nov. 5, 1929

1,734,718

UNITED STATES PATENT OFFICE

FORREST V. DONALD, OF PORT WASHINGTON, WISCONSIN, ASSIGNOR TO THE GILSON MANUFACTURING COMPANY, OF PORT WASHINGTON, WISCONSIN, A CORPORATION OF WISCONSIN

TRANSMISSION UNIT

Application filed May 28, 1925. Serial No. 33,349.

This invention relates to improvements in transmission units for tractors of the type used in lawn mowing and by growers of row crops in seeding, weeding and cultivating.

Tractors of the character above referred to comprise, in general, a suitable frame, ground wheels therfor, a prime mover, and a transmission unit for connecting the latter to said wheels. The ground wheels are spaced to straddle one or more rows of the crops, and in some instances are adjustable transversely of the frame to accommodate them to different conditions. In operating these tractors, the operator steers the same by means of suitable handles fixed to the frame thereof, turns being negotiated by swinging the entire machine about on the ground wheels by means of the handles. When the tractors are operating certain implements, such, for instance, as a three-row cultivator, these implements dig into the ground a certain amount so that considerably difficulty is experienced on the part of the operator in properly guiding the machine along the rows of crops and in swinging the machine about on the ground wheels to negotiate a turn. The transmission units for these tractors, furthermore, have been so constructed that they cannot be adjusted to meet varying conditions, such, for instance, as when the ground wheels are adjusted. In this case, therefore, the entire transmission unit must be removed and another substituted therefor. In many instances, however, the frame of the tractors have been made rigid so that the ground whels therefor bear a fixed relation to each other and are non-adjustable, separate machines being constructed with their respective ground wheels spaced different distances apart to straddle one or more rows of crops, as the case may be. The transmission units for these separate machines, furthermore, have been designed for use in connection with only the particular machine to which it has been applied, and the parts comprising the different units have varied in size and shape. In manufacturing these various tractors and the transmission units therefor, no attempt has heretofore been made to standardize the transmission units and parts therèof whereby they are adaptable to tractors of different size and proportion, the result being a corresponding increase in the cost of manufacture of the machines.

One of the objects of the present invention, therefore, is to provide an improved transmission unit of the character described which is adapted to connect either or both of the ground wheels to the prime mover whereby the tractor is steered or driven straight ahead by the power derived therefrom.

Another object of the invention is to provide an improved transmission unit of the character described in which the parts thereof are adapted for arrangement in reverse order whereby the unit may be adjusted or changed to meet different conditions.

Another object of the invention is to provide an improved transmission unit of the character described having the respective parts thereof so constructed that the unit is interchangeable and adaptable to tractors of various sizes and proportions.

Another object is to provide an improved transmission unit of the character described which has many advantages over those constructed heretofore as regards efficiency, durability, simplicity of construction and cost of manufacture.

Other objects and advantages will hereinafter appear.

For the purpose of illustrating the invention several embodiments thereof are shown in the drawings, in which:

Fig. 3 is a plan view, partly in section, of the transmission unit;

Fig. 4 is a section on line 4—4 of Fig. 3;

Fig. 5 is a fragmentary view, showing a modification;

Fig. 6 is a plan view of the transmission unit, showing the respective parts thereof arranged in the reverse order in which they are arranged in Fig. 3.

Figure 1:
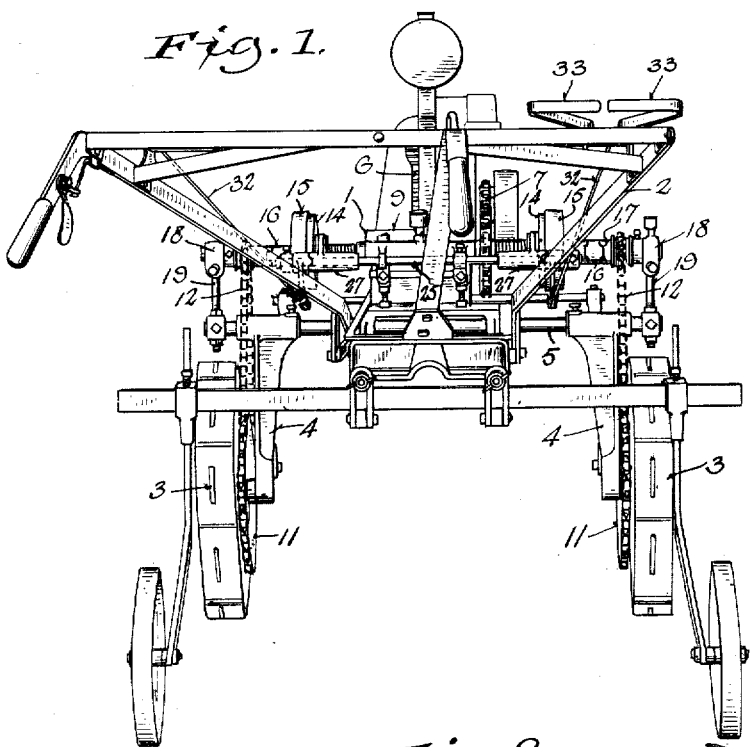
Figure 1 is a perspective view of a tractor showing the transmission unit applied thereto.

Referring more particularly to Fig. 1, the transmission unit designated generally by the reference numeral 1 is shown applied to a tractor comprising, in general, a frame 2, ground wheels 3 supported by brackets 4 adjustable transversely of the frame along a suitable shaft 5, and a prime mover such as a gasoline engine 6, the prime mover being connected to the transmission unit by means of a chain 7 driven by a sprocket wheel (not shown) fixed to the crank shaft of the engine.

As shown in Fig. 3, the transmission unit comprises a shaft 8 journaled in a suitable bearing member 9 and provided with a sprocket wheel 10 fixed to the shaft and receiving chain 7 whereby the shaft is connected directly to the crank shaft of engine 6 for operation thereby. Sprocket wheels 11 are fixed to each of the ground wheels 3 for rotation therewith and connected by means of chains 12 to sprocket wheels 13 loosely mounted on shaft 8. From the foregoing it will be obvious that by connecting both sprocket wheels 13 to shaft 8 for rotation therewith, both ground wheels 3 will be operated by the prime mover 6 and the machine driven straight ahead, and that upon connecting only one of the sprocket wheels 13 to shaft 8 for rotation therewith, the ground wheel associated with this sprocket wheel will be driven and the machine turned about in the corresponding direction by the power derived from the prime mover. The means for connecting either or both sprocket wheels 13 to shaft 8 for rotation therewith will now be described, referring more particularly to Figs. 3 and 4.

Driving clutch members 14 are splined to shaft 8 for rotation therewith and for movement longitudinally thereof, and driven clutch members 15 loosely mounted on the shaft and connected to sprocket wheels 13 for rotation therewith by means of collars 16 and 17 loosely mounted on the shaft, the ends of the collars and the driven clutch members 15 and sprocket wheels 13 being provided with interlocking teeth, as shown, whereby these parts are connected for rotation together. The ends of shaft 8 are supported by and journaled in suitable bearings 18 supported above shaft 5 by means of members 19. Springs 20 are arranged on shaft 8 between the grooved collars 21 with which the driven clutch members 14 are provided and bearing member 9 and sprocket wheel 10 respectively, as shown, whereby the driving clutch members 14 are normally held in operative engagement with the driven clutch members 15 to connect both of the ground wheels 3 to the crank shaft of engine 6, as explained above, to drive straight ahead, collars 22 being fixed to shaft 8 at the ends thereof to prevent outward movement of the driven clutch members, collars 16 and 17 and sprocket wheels 13. For the purpose of disengaging either or both of the driving clutch members 14 from driven clutch members 15, arms 23 having the forked ends 24 thereof engaging the grooved collars 21, as shown, are loosely mounted on a shaft 25 supported by members 26 which may be cast integrally with bearing member 9, the ends 27 of arms 23 being provided with cam recesses 28 which receive correspondingly shaped lugs 29 cast integrally with collars 30 loosely mounted on shaft 25 and provided with depending arms 31 connected by rods 32 to control levers 33 pivotally connected in any suitable way to frame 2 of the tractor. Collars 34 are fixed to the ends of shaft 25 to prevent outward movement of collars 30 along the shaft. From the foregoing it will be seen that by moving either or both levers 33 to the position shown in Fig. 1, rods 32 will be placed under tension and collars 30 rotated with respect to the ends 27 of arms 23 whereby the lugs 29 will be forced from recesses 28 by a cam action and arms 23 moved inwardly thereby along shaft 25 to compress springs 20 and disengage driving clutch members 14 from driven clutch members 15. The levers 33 are moved to the position shown in Fig. 1 in starting the engine, in which position both ground wheels are disconnected therefrom and all load removed from the same. The transmission unit, therefore, is adapted to connect either or both of the ground wheels 3 to the prime mover for driving straight ahead, or turning in either direction, as the case may be, thus giving the operator complete control of the machine and relieving him of the great exertion necessary heretofore in steering. The bearing member 9 may be secured to frame 2 of the tractor by any suitable means such as a bracket 35.

If it should be desired to adjust the ground wheels 3 transversely of the frame by adjusting brackets 4 along shaft 5, one or more of the collars 16 and 17 may be removed, or other collars added to maintain alignment of sprocket wheels 13 with sprocket wheels 11. It will thus be seen that the machine can be adjusted to meet varying conditions without dismantling the entire transmission unit, or removing the old unit and substituting a new one therefor. Collars 17 and 22 may be provided with flanges 36 and 37 for preventing accidental disengagement of chains 12 from sprocket wheels 13.

Figure 2:
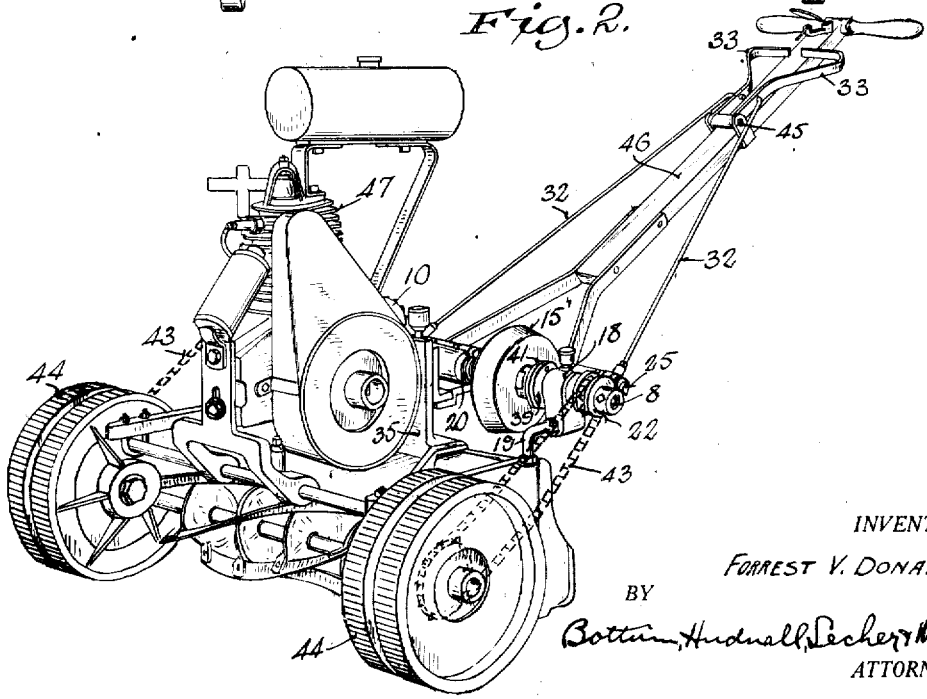
Fig. 2 is a perspective view showing the transmission unit applied to a power-driven lawn mower.

In lieu of providing collars 16 and driven clutch members 15 with interlocking teeth for connecting the same for rotation together, collars 38 may be provided with flanges 39 connected by means of pins 40 with flanges 41 cast integrally with the driven clutch members 15', as shown in Fig. 5, this construction being used in connection with the power-driven mower, as shown in Fig. 2. The pins 40 are constructed to shear through if the rotary cutting blade should strike an obstruction, thereby disconnecting the blade from the driving shaft and preventing damage to the machine.

If it is desired to apply the transmission unit to a tractor in which the ground wheels thereof are much closer together than the ground wheels of the tractor shown in Fig. 1, and removal of all of the collars 16 and 17 is found not to be sufficient to bring sprocket wheels 13 close enough together so that they will be in alignment with sprocket wheels 11, the respective parts of the transmission unit, as shown in Fig. 6, may be arranged in the reverse order in which they are arranged in Fig. 3, thus bringing sprocket wheels 13 close enough together to meet any conditions which may arise in actual practice. In the arrangement shown in Fig. 6, the driven clutch members 15 are shown as being connected directly to sprocket wheels 13, but of course these clutch members may be adjusted and spaced apart any desired amount to adapt them to a particular machine by arranging collars 16 and 17 between sprocket wheels 13 and clutch members 15, in the same manner as shown in Fig. 3. In the arrangement shown in Fig. 6, furthermore, the springs 20 act against collars 42 fixed to the ends of shaft 8 for the purpose of normally urging the driving clutch members 14 inwardly and holding the same in operative engagement with driven clutch members 15. The position of arms 23 and collars 30 and 34 on shaft 25 is reversed, as shown, so that upon rotation of collars 30, arms 23 will be forced outwardly to compress springs 20 and disengage the clutch members. The transmission unit is, therefore, comprised of standard parts which are interchangeable, and which may be arranged in different ways to adapt the unit to tractors of different construction and proportion. It is, therefore, possible to manufacture these units on a much larger scale than those constructed heretofore, with a corresponding decrease in the manufacturing cost of the former.

In Fig. 2 the transmission unit has been shown applied to a power-driven lawn mower of the usual type, the unit being constructed in accordance with the modified form shown in Fig. 5, as explained above. The sprocket wheels 13 are connected by means of chains 43 to the ground wheels 44. The control levers 33 are pivoted in any suitable manner at 45 to the usual handle 46. Upon raising either or both of levers 33, rotation of collars 30 will permit lugs 29 to enter recesses 28 and arms 23 to move outwardly along shaft 25 as viewed in Fig. 3, under the action of springs 20 and thus effect engagement of driving clutch members 14 with driven clutch members 15. The ground wheels 44 will then be connected to the crank shaft of engine 47 for driving straight ahead. Upon movement of any one of the levers 33 to the position shown in Fig. 2, the corresponding ground wheel 44 will be disconnected from the engine and the machine caused to turn about in the direction desired by means of the power derived from engine 47. The operator is thereby relieved of all exertion necessary heretofore in steering machines of this type, this difficulty being particularly troublesome when the machine is traveling upon soft ground and through tall grass.

Referring to Figs. 3 and 4, bearing member 9 is adjustably secured to bracket 35 by means of bolts 48 extending through longitudinal slots in the base of the bracket and bolts 49 passing through lugs 50 integral with bearing member 9 and engaging the rear edge of the base of bracket 35, as shown. The bearing member may be adjusted longitudinally of the machine to slacken or tighten up on drive chain 7 by loosening bolts 48 and adjusting bolts 49. Bracket 35 is secured to the frame member 2' for vertical adjustment with respect thereto by means of bolts 52 passing through vertical slots in the bracket and threaded into member 2', as shown, and bolts 53 threaded into the base of bracket 35 and engaging the base of member 2'. By loosening bolts 52 and adjusting bolts 53, the distance between sprocket wheels 11 and 13 may be varied to slacken or tighten up on chains 12. It will, therefore, be seen that a support for the transmission unit 1 has been provided whereby the same may be adjusted vertically and longitudinally of the machine.

The operating levers 33, as shown in Figs. 1 and 2, are complimentary and have their free ends arranged close together and in alignment. The operator is thereby enabled to grasp both levers with one hand and raise or lower the same to release or engage both pair of clutch members at the same instant, or to shift quickly from one lever to the other for actuating one pair of clutch members independently of the other in making a turn.

A preferred embodiment of the invention has been shown in the drawings, but of course many changes in the size, shape and arrangement of parts may be made without departing from the spirit of the invention or the scope of the claims.

The invention claimed is:

1. A transmission unit of the character described comprising a bearing member, a shaft extending loosely through said bearing member on either side thereof, driving elements loosely arranged on said shaft on either side of said bearing member and adapted for connection to the ground wheels of a vehicle, clutch means arranged on said shaft for connecting either or both of said elements to said shaft for rotation thereby, shifting elements operatively associated with said clutch means, supporting means on said bearing member for said shifting elements, said supporting means constraining said shifting elements to sliding movement, rotatable actuating elements mounted on said supporting means and coacting with the shifting elements to control and actuate the same, and manually operable means for controlling and moving said actuating elements.

2. A transmission unit of the character described comprising a bearing member, a shaft extending loosely through said bearing member on either side thereof, driving elements loosely arranged on said shaft on either side of said bearing member and adapted for connection to the ground wheels of a vehicle, clutch means arranged on said shaft for connecting either or both of said elements to said shaft for rotation thereby, shifting elements operatively associated with said clutch means, supporting means on said bearing member for said shifting elements, said supporting means constraining said shifting elements to sliding movement, rotatable actuating elements mounted on said supporting means and coacting with the shifting elements to control and actuate the same, hand levers pivotally mounted for independent movement and located adjacent each other whereby they may also be operated simultaneously, and motion transmission means between each hand lever and its actuating element.

3. In combination with a tractor of the character described comprising a frame, ground wheels associated with said frame and adjustable transversely thereof, and a prime mover supported by said frame, of a shaft supported by said frame and connected to said prime mover for rotation thereby, driving friction clutch members splined to said shaft, driven friction clutch members directly and loosely mounted on said shaft for engagement with said driving clutch members, driving connections between said wheels and said driven clutch members, means mounted on but independent of the shaft for affording an adjustable operative connection between the driven clutch members and the driving connections whereby said driving connections are adjustable to secure alinement between said driven clutch members and said wheels upon adjustment of the latter, and means operable at the will of the operator for effecting engagement and disengagement of either or both of said clutch mmebers whereby said tractor may be steered by the power derived from said prime mover.

4. In combination with a tractor of the character described comprising a frame, ground wheels associated with said frame and adjustable transversely thereof, and a prime mover supported by said frame, of a shaft supported by said frame and connected to said prime mover for rotation thereby, driving friction clutch members splined to said shaft, driven friction clutch members loosely mounted on said shaft for engagement with said driving clutch members, driving connections between said wheels and said driven clutch members, collars arranged on said shaft between said driven clutch members and said driving connections for positioning the latter in alignment with said wheels upon adjustment thereof, and means operable at the will of the operator for effecting engagement and disengagement of either or both of said clutch members whereby said tractor may be steered by the power derived from said prime mover.

5. In a tractor of the character described comprising a frame, ground wheels associated with said frame and adjustable transversely thereof, and a prime mover supported by said frame, of a shaft connected to said prime mover for rotation thereby, driving members loosely mounted on said shaft and connected to said wheels, removable spacing collars arranged upon said shaft and provided with interlocking teeth at the ends thereof for connecting the same and said driving members for rotation together, the spacing collars being removed and replaced to aline the driving members with the wheels upon adjustment of the wheels, and means adapted to connect said driving members to said shaft for rotation therewith.

6. In a transmission unit of the character described, a shaft, a bearing therefor, driving elements loosely mounted on said shaft on either side of said bearing, clutches mounted on said shaft and adapted to connect said elements to the latter for rotation therewith, and means associated with each of said clutches for operating the same, said elements and said clutches and said means being adapted for arrangement on said shaft in reverse order whereby the distance between said elements and also their respective positions on said shaft may be varied.

7. In a transmission unit of the character described, a shaft, a clutch having a driven member loosely mounted on the shaft and a driven element loosely mounted on said shaft in spaced relation to the driven member of the clutch, a spacing collar arranged on said shaft between the driven member of said clutch and said driven element and connecting the latter for rotation together, and means for driving said shaft.

8. In a transmission unit of the character described, a shaft, a bearing therefor, driving friction clutch member splined to said shaft, driven friction clutch members loosely mounted on said shaft for engagement with said driving clutch members, springs urging said clutch members into operative engagement, driving members connected to said driven clutch members for rotation therewith, a second shaft supported adjacent said clutch members, arms loosely mounted on said second shaft and connected with said driving clutch members, cam members adapted to engage and actuate said arms to effect movement of either or both of said driving clutch members into and out of operative relation with said driven clutch members, and means operable at the will of the operator for controlling the action of said cam members.

9. An automotive structure comprising a frame having handle means extending rearwardly therefrom, a pair of traction elements for said frame, a prime mover supported by said frame, a driving connection between said prime mover and said traction elements including a clutch between each of said traction elements and said prime mover, and manually operable clutch controlling mechanism permitting the operator to start, steer and stop the automotive structure with one hand and comprising a pair of complimentary hand lever sections mounted on said handle means for independent manual actuation and movement and located adjacent each other so as to be adapted to be grasped by one hand and simultaneously operated to engage or disengage both clutches, said levers also being independently operable to effect the engagement and disengagement of either clutch independently of the other.

10. A tractor of the character described comprising a frame, a pair of traction elements supporting the frame, a prime mover supported by said frame, a driving connection between the prime mover and the traction elements and including a clutch between said prime mover and each of said traction elements and manually operable clutch controlling mechanism permitting starting, steering and stopping of the tractor, and including two hand lever sections mounted for independent manual actuation and movement, and connected with the clutches, said hand levers being located adjacent each other and being adapted to be grasped with one hand and simultaneously adjusted to engage or disengage both clutches and also being adapted to be independently and separately grasped and manipulated to engage or disengage either clutch independently of the other clutch.

11. The combination with a tractor of the character described comprising a frame, ground wheels therefor, a prime mover supported by said frame, and a transmission unit adapted and arranged to connect said wheels to said engine for rotation thereby, of a bracket having a base provided with slots extending longitudinally of said tractor, bolts extending through said slots and threaded into said unit for securing the latter to said bracket, and other bolts associated with said bracket and said unit for adjusting the latter in the direction of said slots, a frame member, and means securing said bracket to said frame member for vertical adjustment with respect thereto.

12. In combination with a tractor of the character described comprising a frame, ground wheels associated with the frame and adjustable transversely thereof and a prime mover supported by said frame of a bearing member supported by said frame, a shaft extending loosely through said bearing member and projecting beyond the sides thereof, a driving clutch member splined to said shaft on each side of the bearing member, driven clutch members directly and loosely mounted on said shaft for engagement with said driving clutch members, driving connections between said wheels and said driven clutch members, means mounted on but otherwise independent of the shaft for affording an adjustable operative connection between the driven clutch members and the driving connections whereby said driving connections are adjustable to secure alinement between said driving connections and said wheels upon adjustment of the latter, and means operable at the will of the operator for effecting engagement and disengagement of either or both of said clutch members whereby said tractor may be steered by power derived from said prime mover.

13. In a tractor of the character described, a frame, traction wheels therefor, a prime mover, and transmission mechanism interposed between the latter and said wheels, said transmission mechanism comprising a shaft, a plurality of clutches mounted thereon, a driving connection between the prime mover and said shaft, driving connections between said shaft and said traction wheels, and means whereby the latter connections may be adjusted longitudinally of said shaft to accommodate tractors of varying wheel gauge, said clutches being independently reversible on said shaft to further increase the range of adjustment.

14. A transmission unit of the character described comprising a bearing member, a shaft extending loosely therethrough, driving elements loosely mounted on the shaft and adapted for connection to the ground wheels of a vehicle, clutch means on the shaft for connecting either or both of said driving elements to said shaft for rotation thereby, shifting elements for said clutch means, actuating elements for said shifting elements, a pair of hand levers for controlling said actuating elements, each hand lever being pivoted for independent movement about a single fixed axis, the hand levers being located adjacent each other and having portions extending toward each other and adapted to be grasped by one hand of the operator and to be actuated simultaneously as well as independently.

15. A transmission unit including a shaft, a reversible driving element loosely mounted on the shaft and a reversible clutch assembly mounted on the shaft, said clutch assembly and said driving element having cooperable means adapted to have direct engagement in one assembly of the transmission unit and also adapted to be indirectly connected in another assembly of the unit whereby to vary the position of the driving element on the shaft.

16. A transmission unit adapted for use with vehicles of variable wheel spacing and comprising a shaft, driving elements for the wheels loosely mounted on said shaft, said driving element being reversible on the shaft and reversible clutches adapted to be mounted on the shaft on either side of the driving elements, said clutches and said driving elements having cooperating connecting means adapted for direct engagement in one assembly and indirect connection in the other assembly.

In witness whereof I hereto affix my signature.

FORREST V. DONALD.

CERTIFICATE OF CORRECTION.

Patent No. 1,734,718.            Granted November 5, 1929, to

FORREST V. DONALD.

It is hereby certified that error appears in the printed specification of the above numbered patent requiring correction as follows: Page 4, line 107, claim 6, for the word "reserve" read "reverse"; and that the said Letters Patent should be read with this correction therein that the same may conform to the record of the case in the Patent Office.

Signed and sealed this 4th day of February, A. D. 1930.

(Seal)                                        M. J. Moore,
                                               Acting Commissioner of Patents.

a reversible driving element loosely mounted on the shaft and a reversible clutch assembly mounted on the shaft, said clutch assembly and said driving element having cooperable means adapted to have direct engagement in one assembly of the transmission unit and also adapted to be indirectly connected in another assembly of the unit whereby to vary the position of the driving element on the shaft.

16. A transmission unit adapted for use with vehicles of variable wheel spacing and comprising a shaft, driving elements for the wheels loosely mounted on said shaft, said driving element being reversible on the shaft and reversible clutches adapted to be mounted on the shaft on either side of the driving elements, said clutches and said driving elements having cooperating connecting means adapted for direct engagement in one assembly and indirect connection in the other assembly.

In witness whereof I hereto affix my signature.

FORREST V. DONALD.

CERTIFICATE OF CORRECTION.

Patent No. 1,734,718.  Granted November 5, 1929, to

FORREST V. DONALD.

It is hereby certified that error appears in the printed specification of the above numbered patent requiring correction as follows: Page 4, line 107, claim 6, for the word "reserve" read "reverse"; and that the said Letters Patent should be read with this correction therein that the same may conform to the record of the case in the Patent Office.

Signed and sealed this 4th day of February, A. D. 1930.

(Seal)

M. J. Moore,
Acting Commissioner of Patents.